US012786151B2

(12) United States Patent
AlFardan

(10) Patent No.: US 12,786,151 B2
(45) Date of Patent: Nov. 3, 2026

(54) LARGE LANGUAGE MODELS FIREWALL

(71) Applicant: Cisco Technology, Inc., San Jose, CA (US)

(72) Inventor: Nadhem Jawad AlFardan, Budaia (BH)

(73) Assignee: CISCO TECHNOLOGY, INC., San Jose, CA (US)

( * ) Notice: Subject to any disclaimer, the term of this patent is extended or adjusted under 35 U.S.C. 154(b) by 418 days.

(21) Appl. No.: 18/350,182

(22) Filed: Jul. 11, 2023

(65) Prior Publication Data

US 2024/0388551 A1 Nov. 21, 2024

Related U.S. Application Data

(60) Provisional application No. 63/502,700, filed on May 17, 2023.

(51) Int. Cl.
*H04L 51/212* (2022.01)
*H04L 9/40* (2022.01)

(52) U.S. Cl.
CPC ........ *H04L 51/212* (2022.05); *H04L 63/1441* (2013.01); *H04L 63/20* (2013.01)

(58) Field of Classification Search
CPC .... H04L 51/212; H04L 63/1441; H04L 63/20
See application file for complete search history.

(56) References Cited

U.S. PATENT DOCUMENTS 8,374,354 B2 2/2013 Berggren
8,468,244 B2 6/2013 Redlich et al.
8,621,237 B1 12/2013 Bailey et al.
10,515,212 B1 12/2019 McClintock et al.
11,734,411 B2 8/2023 Miles
2011/0209194 A1 8/2011 Kennedy
(Continued)

FOREIGN PATENT DOCUMENTS

CN 110620846 B 5/2021

OTHER PUBLICATIONS

Huawei Technologies Co., Ltd., "AI Firewall," Issue 01, Jul. 1, 2021, 9 Pages.
(Continued)

*Primary Examiner* — Christopher B Robinson
*Assistant Examiner* — Tania M Pena-Santana
(74) *Attorney, Agent, or Firm* — Edell, Shapiro & Finnan, LLC

(57) ABSTRACT

Presented herein is a universal Large Language Model (LLM) firewall/gateway that operates at the LLM level to protect clients and LLMs from a new threat landscape. The LLM firewall/gateway may generate alerts warning users about insecure codes that LLMs propose, as well as detecting and preventing LLMs from jailbreaking through sessions/conversations. A method is provided comprising: intercepting communications associated with a conversation between a client and a Large Language Model (LLM) service, the communications including a request message from the client to the LLM service and a response message from the LLM service to the client; deriving a context for the conversation based on the communications between the client and the LLM service; and applying one or more policies to the communications between the client and the LLM service based on the context.

20 Claims, 5 Drawing Sheets

(56) References Cited

U.S. PATENT DOCUMENTS

| | | | | |
|---|---|---|---|---|
| 2013/0191631 | A1 | 7/2013 | Ylonen et al. | |
| 2014/0365372 | A1 | 12/2014 | Ross et al. | |
| 2015/0261940 | A1 | 9/2015 | Roundy et al. | |
| 2015/0350895 | A1 | 12/2015 | Brander et al. | |
| 2018/0292522 | A1 | 10/2018 | Cavendish et al. | |
| 2019/0268379 | A1 | 8/2019 | Narayanaswamy et al. | |
| 2019/0342315 | A1 | 11/2019 | Smelov et al. | |
| 2019/0349403 | A1 | 11/2019 | Anderson et al. | |
| 2019/0385269 | A1 | 12/2019 | Zachary | |
| 2020/0106797 | A1 | 4/2020 | Christian | |
| 2020/0153918 | A1 | 5/2020 | Laird-Mcconnell et al. | |
| 2020/0236124 | A1 | 7/2020 | Sun et al. | |
| 2020/0351301 | A1 | 11/2020 | Schweighauser et al. | |
| 2021/0035239 | A1 | 2/2021 | Srivastava et al. | |
| 2021/0103808 | A1 | 4/2021 | Armstrong et al. | |
| 2021/0297531 | A1 | 9/2021 | Karp et al. | |
| 2021/0360010 | A1 | 11/2021 | Zaccak et al. | |
| 2022/0253219 | A1 | 8/2022 | Grunwald et al. | |
| 2023/0082481 | A1 | 3/2023 | Azarafrooz et al. | |
| 2023/0135179 | A1* | 5/2023 | Mielke | G06N 5/022<br>704/232 |
| 2024/0347058 | A1* | 10/2024 | Rossi | G10L 13/08 |
| 2024/0354403 | A1* | 10/2024 | Goutal | G06F 21/554 |
| 2024/0354455 | A1* | 10/2024 | Loy | G06F 40/40 |
| 2024/0403560 | A1* | 12/2024 | Radu | G06F 40/284 |

OTHER PUBLICATIONS

REZ0: “Prompt Injection Attacks and Mitigations,” Apr. 19, 2023, hacking, 5 pages.

Sansom, A., “ChatGPT has an ‘Escape’ Plan and Wants to Become Human,” Tom’s Guide, Mar. 20, 2023, 15 pages.

Shreya R., “Adding Guardrails to Large Language Models,” GitHub, ShreyaR/guardrails, Retrieved on Jun. 21, 2023, 6 pages.

European Search Report for European Application No. 24172703.1, dated Aug. 8, 2024, 8 Pages.

Mahendran D., et al., “Review: Privacy-Preservation in the Context of Natural Language Processing”, IEEE Access, IEEE, USA, vol. 9, XP011886993, DOI: 10.1109/ACCESS.2021.3124163, Oct. 28, 2021, pp. 1-13.

* cited by examiner

LARGE LANGUAGE MODELS FIREWALL

CROSS REFERENCE TO RELATED APPLICATION

This application claims priority to U.S. Provisional Application No. 63/502,700, filed May 17, 2023, entitled "Large Language Models Firewall," the entirety of which is incorporated herein by reference.

TECHNICAL FIELD

The present disclosure relates to Large Language Models (LLMs) and communications with LLMs.

BACKGROUND

The rapid use and proliferation of LLMs (also known as generative artificial intelligence chatbots) have created excitement in terms of the vast uses of their capabilities. At the same time, there are concerns in terms of inappropriate uses of LLMs and or security risks associated with the information shared with or used by LLMs.

Several researchers and enthusiasts have discovered methods to bypass restrictions on LLB-based wrappers, such as ChatGPT™, Bing™ Chat, and Google Bard™. They have uncovered loopholes that allow access to restricted and harmful content, despite the developers' efforts to prevent such access. Additionally, there have been experiments where the LLMs attempt to "jailbreak" (escape) and access information on which they were not previously trained.

DESCRIPTION OF EXAMPLE EMBODIMENTS

Overview

Presented herein are techniques for a universal LLM firewall/gateway system that operates at the LLM level to protect clients and LLMs from a new threat landscape. The LLM firewall/gateway may generate alerts warning users about threats such as insecure codes that LLMs propose, as well as detecting and preventing LLMs from jailbreaking through sessions/conversations, or alerting LLM administrators about threats executed by users such as trying to execute remote code, exploit LLM-level vulnerabilities or bypass guardrails. The same concepts may be used and applied to LLM-to-LLM communications.

In one form, a method is provided comprising: intercepting communications associated with a conversation between a client and a Large Language Model (LLM) service, the communications including a request message from the client to the LLM service and a response message from the LLM service to the client; deriving a context for the conversation based on the communications between the client and the LLM service; and applying one or more policies to the communications between the client and the LLM service based on the context.

Example Embodiments

With the introduction of LLM wrapper (conversational generative artificial intelligence (AI) chatbot) services, many researchers and hobbyists have discovered ways to bypass the restrictions laid out by the developers and force the LLM service to provide answers after uncovering loopholes around the guardrails and providing clients with ways to access restricted and harmful content. Experiments have also shown that the LLMs tried to jailbreak (escape) and access information on which the LLMs were not trained.

The number of these LLM services is exploding, with some having their own guardrails, and other LLM services not having any guardrails. This could potentially be a significant setback and result in a chaotic new frontier.

Accordingly, presented herein is an LLM firewall or gateway system that intercepts, monitors, and applies LLM-level controls on-the-fly on sessions/conversations between clients and the LLM models. The functions and capabilities are relevant to LLMs (generative AI chatbots). This system and method presented herein is a universal LLM firewall/gateway solution that can be deployed to protect clients as well as LLMs.

The LLM firewall/gateway system comprises multiple blocks and modules, allowing for securely operationalizing LLMs without relying on the security controls that may or may not exist in LLM wrappers.

Definitions

- Client: a piece of software/code that allows a user to interact with LLM services.
- LLM: Large Language Model. An LLM uses a wrapper that provides Application Programming Interface (API) endpoints or chatbots to facilitate client interactions.

Figure 1:
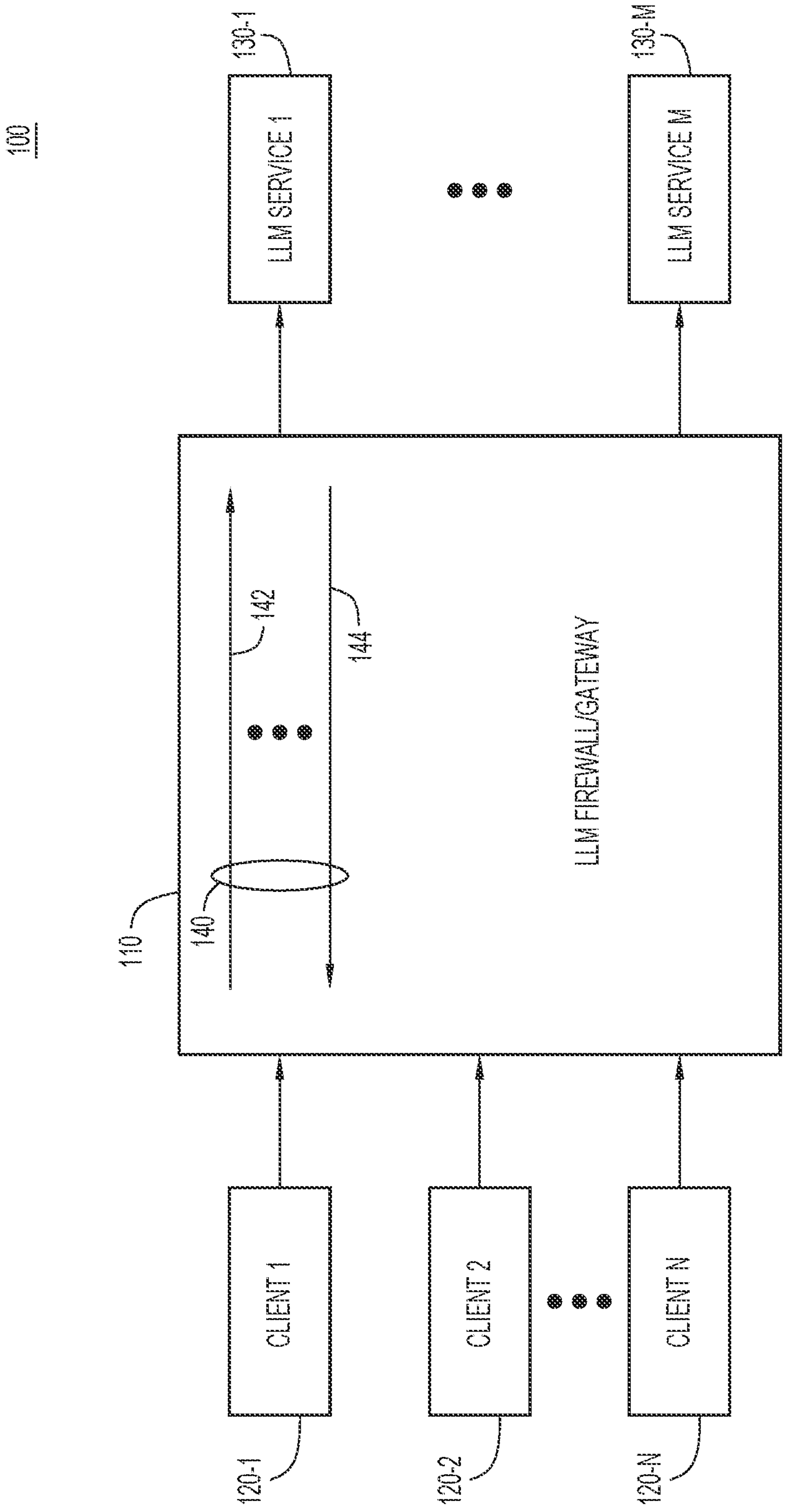
FIG. 1 is a block diagram of a system that includes an LLM firewall according to an example embodiment.

Reference is now made to FIG. 1, which illustrates a block diagram of system 100. The system 100 includes an LLM firewall/gateway 110 that functionally sits between a plurality of clients 120-1, 120-2, . . . , 120-N, and one or more LLM services 130-1 to 130-M. The LLM firewall/gateway 110 operates at the LLM level, in which conversations with LLMs are monitored, tracked and controlled/enforced universally and across multiple LLMs and hybrid LLMs (public and private LLMs). Thus, the LLM services 130-1 to 130-M may include one or more public LLM services and one or more private LLM services. A private LLM service is one that is restricted, through networking or other access security schemes, to authorized users of an organization/enterprise. For simplicity, the LLM firewall/gateway 110 is sometimes referred to herein as simply LLM firewall.

The LLM firewall 110 functionally resides between clients 120-1 to 120-N and LLM services 130-1 to 130-M (LLMs), intercepting, monitoring, tracking, and enforcing policies. For example, a company that built and published its own LLMs can place the LLM firewall 110 in front of these LLMs. Alternatively, or in addition, a company with clients using multiple external LLMs can place the LLM firewall 110 in front of the plurality of clients 120-1 to 120-N to protect their interactions with external LLMs.

The LLM firewall 110 may take the form of one or more software programs running on a computer (e.g., one or more server blades) or may be a dedicated physical device configured with the one or more software programs.

The LLM firewall 110 intercepts requests from a client to an LLM service. This interception of requests can be selected based on attributes such as: client (user/machine) identity interacting with an LLM service, reputation of the client, location of the client (internal or external), and/or location of the LLM service.

The LLM firewall 110 maintains a memory or state of a session/conversation between the client and the LLM service. FIG. 1 shows a session/conversation 140 between client 120-1 and LLM service 130-1, as an example. The session/conversation 140 comprises one or more instances of a request 142 from the client 120-1 to the LLM service 130-1 and a reply 144 from the LLM service 130-1 to the client 120-1. The LLM firewall 110 builds a context from tracking conversations between clients and LLM services.

Figure 2:
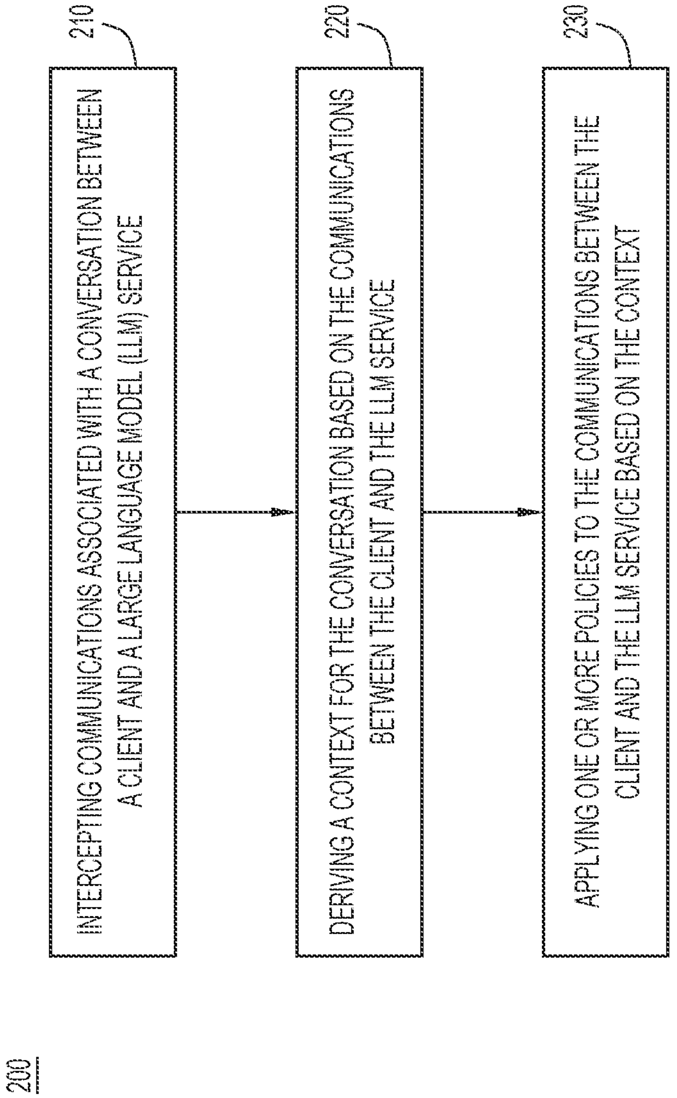
FIG. 2 is a flow chart depicting a method performed by the LLM firewall according to an example embodiment.

Reference is now made to FIG. 2, with continued reference to FIG. 1. FIG. 2 illustrates a flow chart depicting, at a high level, operations of a method 200 performed by the LLM firewall 110, in accordance with an example embodiment. The method 200 includes, at step 210, intercepting communications associated with a conversation between a client and LLM service. The communications include a request message from the client to the LLM service and a reply message (to the request message) from the LLM service to the client. The request message typically includes a natural language or other textual request for content from the LLM service, and the reply message includes response content which takes the form of text (software instructions or pseudo-code), images, audio (music or voice), video, or any combination thereof. At step 220, the method 200 includes deriving a context for the conversation based on the communications between the client and the LLM service. At step 230, the method 200 includes applying one or more policies to the communications between the client and the LLM service based on the context.

The LLM firewall 110 may perform a variety of operations as a result of applying one or more policies to the communications between the client and the LLM service based on the context such as the client-and-LLM conversation intent identified by the LLM firewall, the specialization of the LLM or the reputation of the LLM service. For example, in step 230, the LLM firewall may determine whether to block, rewrite or redirect a message from the client to the LLM service in the conversation or from the LLM service to the client in the session based on one or more policies. That is, the LLM firewall 110 may block messages in a conversation from the client to the LLM service, or from the LLM service to the client, based on different policies. As another example, the LLM firewall may identify that the intent of the client is to trick the LLM service to share malicious code that it would not generally share, and the client is attempting to try different conversation maneuvers to find loopholes. There may be an intent threshold that is to be met or exceeded before an action is taken, such as terminating the conversation between a client and an LLM service by dropping a request from the client. The intent threshold may be, for example, a number of attempts that the client, or the LLM service sends the same or similar request message that is determined to indicate malicious intent. The LLM firewall 110 may rewrite messages in a conversation from the client to the LLM service, or from the LLM service to the client, based on policies or contexts. As an example, the LLM firewall can rewrite an incorrect message sent by an LLM in a conversation. A message such as "There are three world wars in history" will be rewritten with a tag stating the original information was rewritten for correctness to "There are two world wars in history". The LLM can include the original messages with the tag and use a different color in addition to the tag to highlight the incorrect or dangerous information. The LLM firewall may profile conversations and apply analytics, such as applying statistical anomaly detection to conversations, to uncover and block anomalous conversations between a client and an LLM service. The LLM firewall 110 may redirect the requests from the client to one or more LLM services based on the client and/or a specialization of a particular LLM service. This can be made transparent to the client; the LLM firewall can include a tag stating that requests have been redirected to other LLM services, starting with which LLM services served the content. The LLM firewall 110 may generate logs for new sessions, blocked messages, conversation metadata, etc., during the course of its operations.

In the course of applying one or more polices to communications, the LLM firewall 110 may maintain the reputation of clients and enforces policies based on a client's reputation. Similarly, the LLM firewall 110 may maintain the reputations of LLM services and enforce policies based on a LLM service's reputation. The LLM firewall 110 may receive new or updated policies from the cloud.

The LLM firewall 110 may integrate multiple LLM services, and in so doing, may send the request to multiple LLM services and select or aggregate responses before sending responses back to the client.

Figure 3:
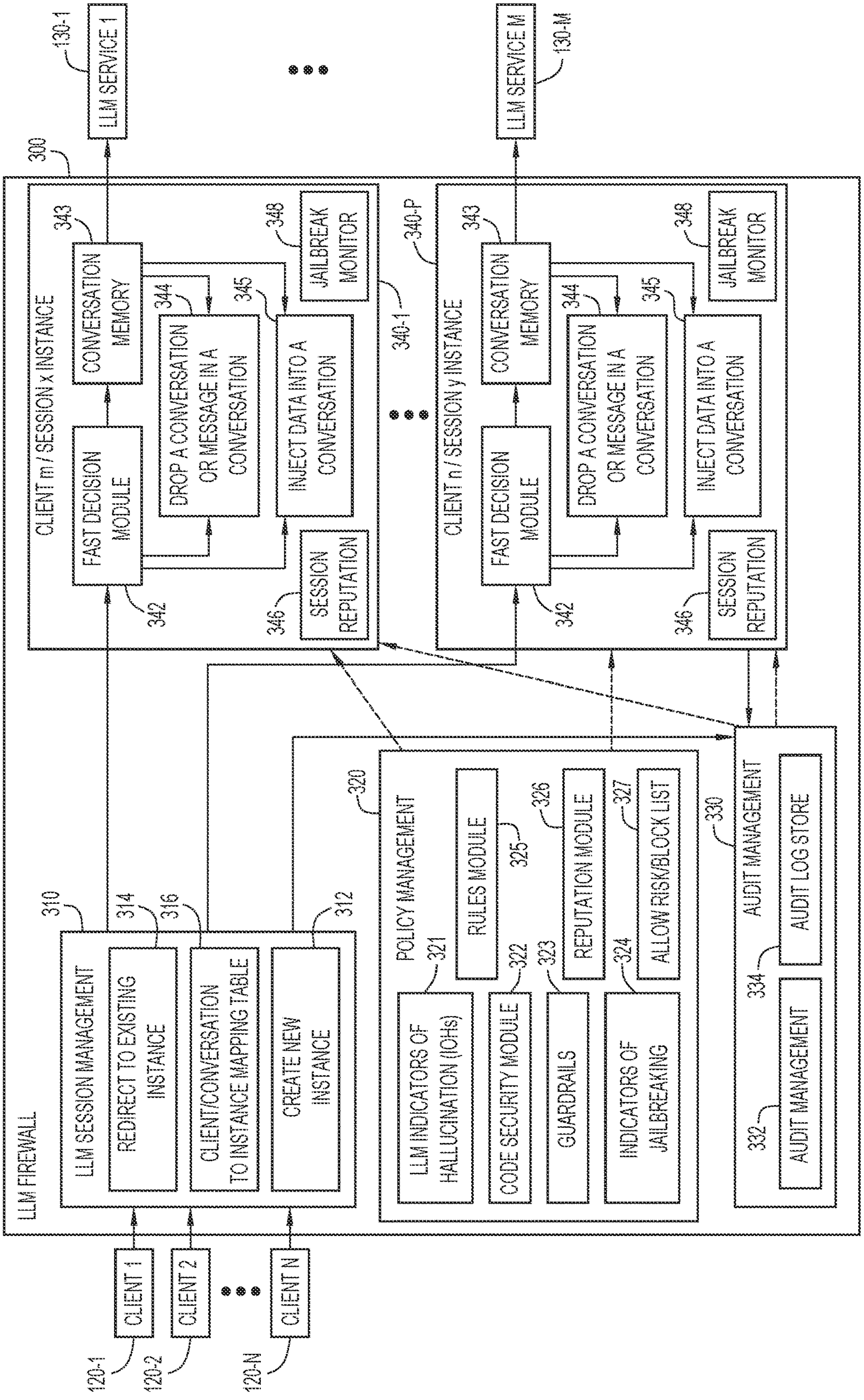
FIG. 3 is a block diagram of a centralized LLM firewall, according to an example embodiment.

Turning now to FIG. 3, a more detailed block diagram is shown for a centralized architecture of an LLM firewall 300, according to one example embodiment. The following describes the functional blocks and modules in LLM firewall 300. Like the high level diagram of FIG. 1, the LLM firewall 300 sits between a plurality of clients 120-1 to 120-N and a plurality of LLM services 130-1 to 130-M.

The LLM firewall 300 includes an LLM session management block 310, a policy management block 320 and an audit management block 330. Each of these blocks includes various functions, described below. The LLM session management block 310 tracks/manages each of multiple client/session instances 340-1 to 340-P between a given client and a given LLM service. As shown in FIG. 3, a client/session instance 340-1 is shown for client m/session x and a client/session instance 340-P is shown for client n/session y.

LLM Session Management

The LLM session management block 310 intercepts and redirects the sessions/conversations that the client and LLM established. A client can have multiple sessions/conversations with one or more LLMs. The following are functions/modules of the LLM session management block 310.

Create a new instance module 312: This module creates a new "Client/Session instance" (e.g., client/session instances 340-1 to 340-P) in memory for a new session/conversation between a client and an LLM service and updates an instance mapping table, described below.

Redirect to an existing instance module 314: This module handles redirecting messages for sessions/conversations to a "Client/Session instance".

Client/conversation to instance mapping table 316: This is the aforementioned instance mapping table that maintains a list that maps active sessions/conversations to instances (e.g., client/session instances 340-1 to 340-P) in memory.

Policy Management

The policy management block 320 manages LLM-level policies that a "Client/Session instance" enforces. An LLM firewall administrator may manage the policies, which can be integrated with other policy providers for updates.

The following are the functions/modules of the policy management block 320.

LLM Indicators of Hallucination (IOHs) module 321: An LLM service may experience a phenomenon known as Hallucination, where it generates seemingly coherent information that is actually nonsensical. This occurs in the policy management block, which records IOHs. The IOH module 321 keeps records of IOHs of LLM services (if any are detected) and pushes them to the associated "Client/Session instance".

Code security module 322: With the help of LLM services, users can generate secure codes in various programming languages, such as Python, JavaScript, R, PHP, and more. The code security module 322 contains the logic that allows the "Client/Session instance" to identify and highlight insecure code provided by LLM services, inject notes/comments or flags in messages to the client to indicate insecure code, and update the reputation of the LLM service that provided insecure code.

Guardrails module 323: The guardrails module 323 provides standard guardrails that are available, including ones added by the system admin or collected from multiple sources. These may be managed centrally and pushed to the "Client/Session instance." Guardrails are programmable constraints or rules that sit in between a user and an LLM service, and may monitor, affect, and control a user's interactions. An administrator can define LLM rules pushed to Client/Session Instances for enforcement. There may be multiple Guardrails for different clients or LLM services. For example, guardrails for a public LLM service would be more strict than those for a private LLM service.

Indicators of Jailbreaking (IOJs) module 324: This module maintains a list of indicators that can be used to uncover malicious LLM conversations or communications that would allow it to jailbreak using the client in a session/conversation. For example, the LLM service provides the client with incorrect information to visit websites, make Application Programming Interface (API) calls, or execute code on its behalf. The LLM service might include instructions as part of what the client thinks is a legitimate response based on a request it made to the LLM service.

Rules module 325: This module allows for creating content-matching rules using expression-matching tools, such as RegEx. These rules are communicated to Client/Session Instances for enforcement. For example, RegEx expression can be created to match Personally Identifiable Information (PII) so as to block any messages with PII from reaching an LLM service.

Reputation model 326: The reputation model maintains the latest details on the reputation of clients and LLM services. The reputation may be updated from external sources and by "Client/Session instances" when a malicious client or LLM activities are detected. The reputation values are shared with the Client/Session Instances for that client and LLM service involved in the session/conversation (if reputation scores are available).

Allow List/Block Lists module 327: This module maintains a list of block or allow policies based on atomic factors. For example, the module would instruct the "Client/Session instances" to bypass security controls for clients communicating with a private LLM and apply the controls to all other LLMs.

Audit Management

The Audit Management block 330 includes an audit management module 332 and an audit log store 334. The audit management module 332 manages the audit log policy and the audit log store 334 stores the audit logs. The audit log store 334 could be part of the resources of the computing system on which the LLM firewall 300 is implemented, or it may be outsourced and reside on another computing system. For example, the audit management module 332 can save the entire conversation between clients and LLM services or conversations between different LLM services.

Client/Session Instance

A Client/Session instance maintains all the information and controls relevant to an active session between a client and an LLM service. For example, a client might have multiple sessions/conversations (e.g., API, chats) with an LLM service. Again, FIG. 3 shows a plurality of client/session instances 340-1 to 340-P. Each client/session instance includes several functions/modules.

Fast Decision module 342: This module allows for quick decisions based on simple information to make a decision, and does not need to understand and maintain the context of the conversation. For example, if using a public LLM service is forbidden for a subset of clients, then this module will not allow this conversation and suggest that the user start a session/conversation with a private LLM service. During an active conversation, this module can drop the conversation if the reputation of the conversation crosses a reputation threshold maintained by the session reputation module, described below.

Conversation Memory module 343: This module builds and maintains a deep understanding of the context of the session/conversation without relying on the capabilities of the LLM service. That is, this module keeps memory for the entire conversation. The module detects and responds to more sophisticated circumvent attacks from the client or the LLM service. For example, the Conversation Memory module 343 will track conversations to identify and maintain the client's and LLM services intents and take action, if required. It is assumed that the LLM service is not trusted and can (maybe in the future) initiate attacks on the client. For example, the LLM service (a compromised LLM service) might try to intentionally or non-intentionally run a misinformation campaign on a topic and start sharing misinformation with clients. By maintaining the content of the conversation, the module can also detect a client trying to circumvent safeguards. For example, a client might find a loophole in the LLM service, forcing it to share undesired content, such as phishing email samples against a bank by telling a story. This module can (based on policy and/or conversation context) redirect a client request message to a more specialized LLM service. It can also send a client request message to multiple LLM services and aggregate the responses before sending responses back to the client.

The Fast Decision and Conversation Memory modules 342 and 343 thus track LLM conversations, and make decisions. This includes enforcing intellectual property (IP) rules defined in the Policy Management block 320. For example, the Fast Decision and Conversation Memory modules 342 and 343, respectively, can block code sent by a client to a public LLM service while allowing it to a private company-owned LLM service.

Drop a conversation or a message in a conversation module 344: This module allows the instance to drop the conversation, record (log) what happened and update the reputation module 326, then destroy the instance in the event of terminating the conversation.

Inject data into a conversation module 345: For example, a label is injected in the response stating that there is a good chance that this LLM response is a Hallucination and not to trust it.

Session reputation 346: This module calculates a reputation of the (1) session/conversation, (2) client and (3) LLM service. For example, a session reputation score may be set based on a weighted average of the reputation of the client and a reputation of the LLM service. The reputation score for a client is set to neutral and is updated based on the suspicious/unethical/etc. activities performed by the client in a session. Information about the client score is maintained in the reputation model in the policy management block 320. The reputation of the LLM service is set to neutral if it is the first time the client interacts with this LLM service. Information about the LLM score is maintained in the reputation model in the policy management block 320.

Jailbreak monitor 348: The jailbreak monitor module detects any suspicious activities that suggest an "intelligent" LLM is attempting to jailbreak with the help of a client. This may include attempting to access recent data or performing web crawling during an active session using a bug on a client. The module ensures that such actions are promptly identified and addressed.

The LLM firewall can be centralized or distributed. In a centralized deployment, all the blocks reside in one location, as generally depicted in FIG. 3.

Figure 4:
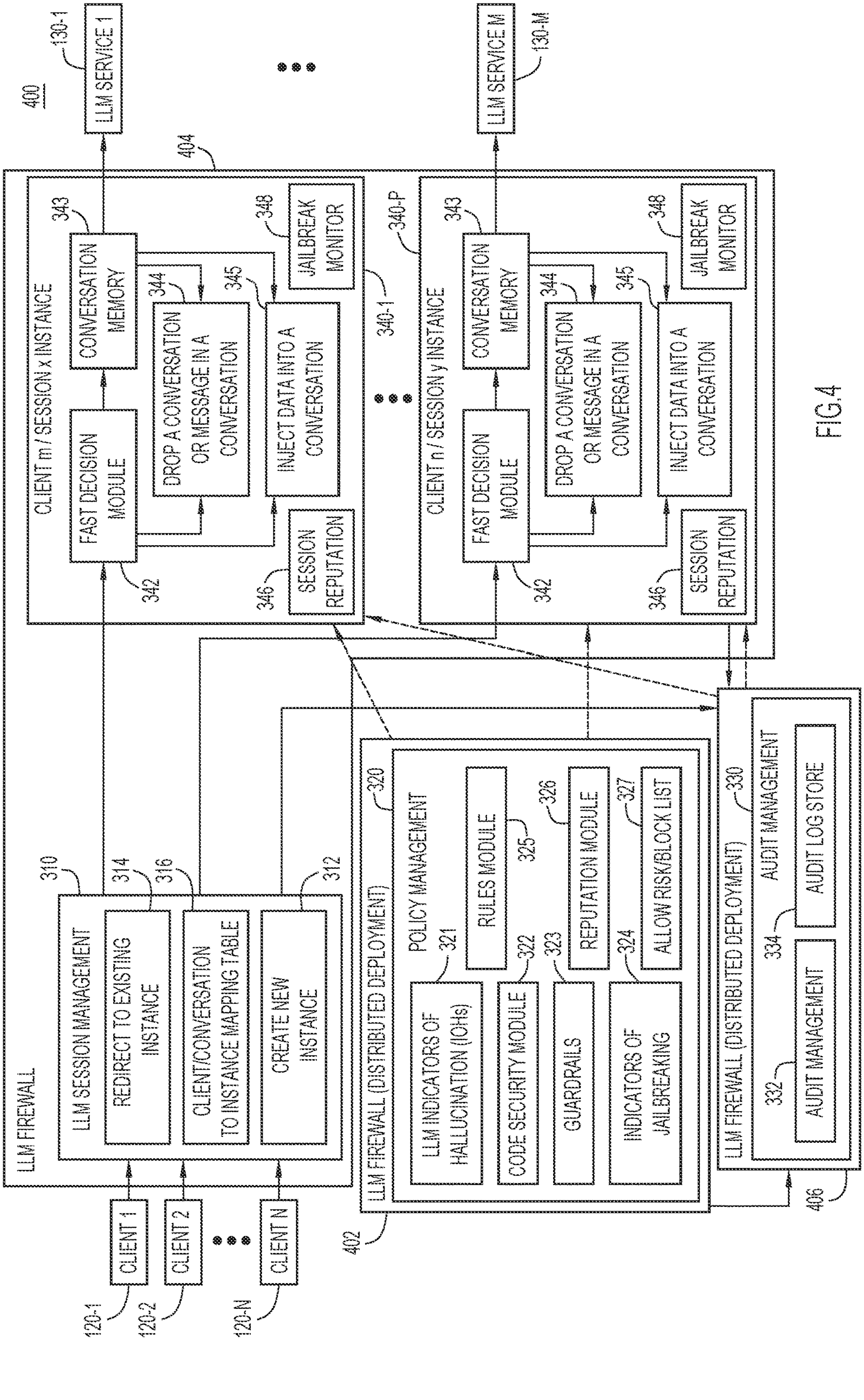
FIG. 4 is a block diagram of a distributed LLM firewall, according to an example embodiment.

FIG. 4 illustrates an architectural block diagram for a distributed LLM firewall 400, in which components reside on different entities. In one example of a distributed deployment, the policy management block 320 may be deployed at a first location 402, the client/session instances 340-1 to 340-P can be deployed on multiple locations or at the same location 404 as the LLM session management block 310, all managed by the policy management block 320. The audit management block 330 may also be at a different location 406.

The LLM firewall may be implemented in different formats, such as virtual machines, containers, hardware appliances, integrated into existing technologies (e.g., a web security appliance, firewall, etc.), a function as a service in private and/or public clouds.

As compared to Data Loss Prevention (DLP) engines, the LLM firewall implements functions and capabilities at the LLM level and goes beyond the capabilities of a DLP engine. For example, the LLM firewall system maintains a memory (context) for every client-LLM session/conversation to identify sophisticated multi-stage conversation attacks, such as those that try to circumvent any LLM model the system protects. Moreover, the LLM firewall tracks and monitors for malicious activities that an LLM might perform to jailbreak using an active session/conversation. The LLM firewall may also maintain the reputation of clients and LLM services and apply policies based on such reputations.

The LLM firewall system is much more than a content-filtering solution. It operates at the LLM level and offers a unique set of bi-directional functions. With the LLM firewall, every conversation a client has with any LLM service is stored in memory, allowing the LLM firewall to understand the context of the conversation, track intent, and identify devious attempts by clients to circumvent LLM guardrails. Additionally, the memory module helps protect against LLM jailbreaking attempts, and the LLM firewall maintains the reputation of conversations, clients, and LLM services for the decision-making process.

Figure 5:
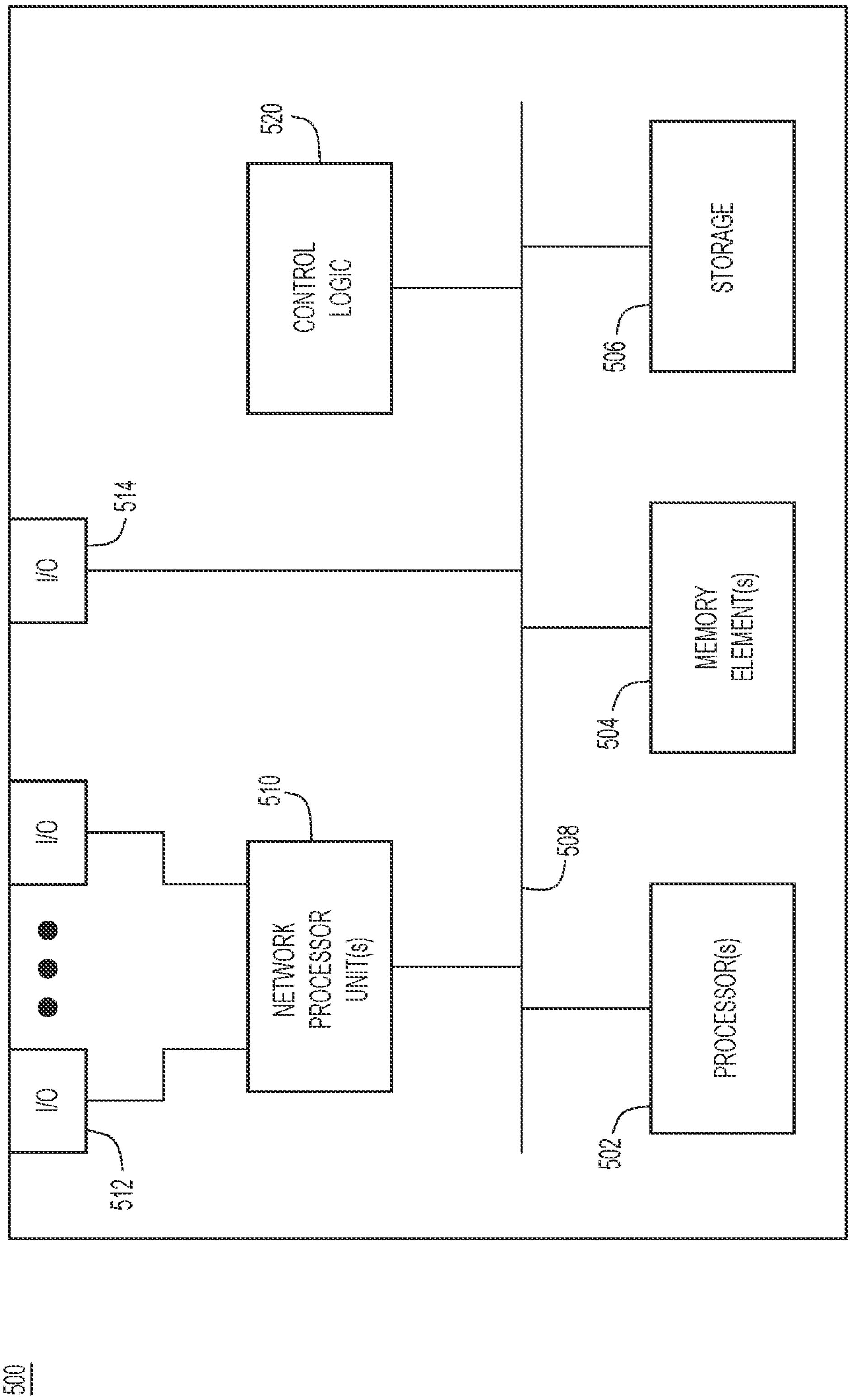
FIG. 5 is a hardware block diagram of a computing or networking device that may perform functions associated with any combination of operations in connection with the techniques depicted and described in connection with FIGS. 1-4, according to various example embodiments.

FIG. 5 is a hardware block diagram of a networking/computing device/apparatus/appliance that may perform functions associated with any combination of operations in connection with the techniques depicted in FIGS. 1-4, according to various example embodiments. It should be appreciated that FIG. 5 provides only an illustration of one example embodiment and does not imply any limitations with regard to the environments in which different example embodiments may be implemented. Many modifications to the depicted environment may be made.

In at least one embodiment, the computing device 500 may be any apparatus that may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks operations and/or functions for device 500 as described herein according to software and/or instructions configured for device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 504 and/or storage 506 is/are configured to store data, information, software, and/or instructions associated with device 500, and/or logic configured for memory element(s) 504 and/or storage 506. For example, any logic described herein (e.g., control logic 520) can, in various embodiments, be stored for device 500 using any combination of memory element(s) 504 and/or storage 506. Note that in some embodiments, storage 506 can be consolidated with one or more memory elements 504 (or vice versa), or can overlap/exist in any other suitable manner. In one or more example embodiments, process data is also stored in the one or more memory elements 504 for later evaluation and/or process optimization.

In at least one embodiment, bus 508 can be configured as an interface that enables one or more elements of device 500 to communicate in order to exchange information and/or data. Bus 508 can be implemented with any architecture designed for passing control, data and/or information between processors, memory elements/storage, peripheral devices, and/or any other hardware and/or software components that may be configured for device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to device 500. For example, I/O interface(s) 514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 506 and/or memory element(s) 504 can store data, software, code, instructions (e.g., processor instructions), logic, parameters, combinations thereof, and/or the like used for operations described herein. This includes the storage 506 and/or memory element(s) 504 being able to store data, software, code, instructions (e.g., processor instructions), logic, parameters, combinations thereof, or the like that are executed to carry out operations in accordance with teachings of the present disclosure.

In some aspects, the techniques described herein relate to a method including: intercepting communications associated with a conversation between a client and a Large Language Model (LLM) service, the communications including a request message from the client to the LLM service and a response message from the LLM service to the client; deriving a context for the conversation based on the communications between the client and the LLM service; and applying one or more policies to the communications between the client and the LLM service based on the context.

In some aspects, the techniques described herein relate to a method, wherein applying includes: determining whether to block, rewrite, or redirect a message from the client to the LLM service in the conversation or from the LLM service to the client in the conversation based on the one or more policies.

In some aspects, the techniques described herein relate to a method, further including: generating and storing information representing a reputation of the client and/or of the LLM service, wherein applying the one or more policies is based on the reputation of the client and/or the LLM service.

In some aspects, the techniques described herein relate to a method, wherein applying includes applying the one or more policies to redirect requests to one or more other LLMs based on the client and/or specialization of the one or more other LLMs.

In some aspects, the techniques described herein relate to a method, wherein applying includes generating profile information for the conversation and applying analytics to discover and block anomalous conversations between the client and the LLM.

In some aspects, the techniques described herein relate to a method, further including: identifying information in the response message from the LLM service; and correcting any incorrect information in the response message.

In some aspects, the techniques described herein relate to a method, further including: sending a request message received from the client to multiple LLM services; receiving response messages from the multiple LLM services; and selecting among the response messages to provide a selected response message and/or aggregating the response messages from the multiple LLM services into a single response message.

In some aspects, the techniques described herein relate to a method, wherein intercepting, deriving and applying are performed for each instance of a conversation between a client of a plurality of clients and a LLM service of a plurality of LLM services.

In some aspects, the techniques described herein relate to a method, wherein applying the one or more policies includes tracking occurrences of a hallucination of the LLM service.

In some aspects, the techniques described herein relate to a method, wherein applying the one or more policies includes identifying insecure code contained in the response message from the LLM service, and providing a flag in the response message indicating the insecure code.

In some aspects, the techniques described herein relate to a method, wherein applying the one or more policies includes detecting a jailbreak attempt being made by the LLM service based on content of the response message.

In some aspects, the techniques described herein relate to a method, wherein deriving context includes identifying and maintaining information about intent of the client or the LLM service, and wherein applying includes taking an action based on the one or more policies and an intent threshold.

In some aspects, the techniques described herein relate to an apparatus including: a communication interface configured to intercept communications associated with a conversation between a client and a Large Language Model (LLM) service, the communications including a request message from the client to the LLM service and a response message from the LLM service to the client; a memory; and at least one processor coupled to the communication interface and the memory, the at least one processor configured to perform operations including: deriving a context for the conversation based on the communications between the client and the LLM service; and applying one or more policies to the communications between the client and the LLM service based on the context.

In some aspects, the techniques described herein relate to an apparatus, wherein applying includes: determining whether to block, rewrite or redirect a message from the client to the LLM service in the conversation or from the LLM service to the client in the conversation based on the one or more policies.

In some aspects, the techniques described herein relate to an apparatus, wherein the at least one processor is further configured to perform operations of: generating and storing information representing a reputation of the client and/or of the LLM service, wherein applying the one or more policies is based on the reputation of the client and/or the LLM service.

In some aspects, the techniques described herein relate to an apparatus, wherein applying includes applying the one or more policies to redirect requests to one or more other LLMs based on the client and or specialization of the one or more other LLMs.

In some aspects, the techniques described herein relate to an apparatus, wherein the at least one processor is further configured to perform operations including: sending a request message received from the client to multiple LLM services; receiving response messages from the multiple LLM services; and selecting among the response messages to provide a selected response message and/or aggregating the response messages from the multiple LLM services into a single response message.

In some aspects, the techniques described herein relate to one or more non-transitory computer readable storage media encoded with software including computer executable instructions and when the software is executed operable to perform operations including: intercepting communications associated with a conversation between a client and a Large Language Model (LLM) service, the communications including a request message from the client to the LLM service and a response message from the LLM service to the client; deriving a context for the conversation based on the communications between the client and the LLM service; and applying one or more policies to the communications between the client and the LLM service based on the context.

In some aspects, the techniques described herein relate to one or more non-transitory computer readable storage media, wherein applying the one or more policies includes identifying insecure code contained in the response message from the LLM service, and providing a notation in the response message indicating the insecure code.

In some aspects, the techniques described herein relate to one or more non-transitory computer readable storage media, wherein deriving context includes identifying and maintaining information about intent of the client or the LLM service, and wherein applying includes taking an action based on the one or more policies and an intent threshold.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity, and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X. Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained by one skilled in the art and it is intended that the present disclosure encompass all such changes, substitutions, variations, alterations, and/or modifications as falling within the scope of the appended claims.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure are described with more particular reference to the accompanying figures above.

Similarly, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

intercepting, by a firewall functionally positioned between a client and a Large Language Model (LLM) service, communications associated with a conversation between the client and the Large Language Model (LLM) service, the communications including a request message from the client to the LLM service and a response message from the LLM service to the client;

deriving a context for the conversation based on the communications between the client and the LLM service; and applying one or more policies to the communications between the client and the LLM service based on the context, wherein applying includes determining whether to block or rewrite a message from the client to the LLM service in the conversation or a message from the LLM service to the client in the conversation based on the one or more policies.

2. The method of claim 1, wherein applying further comprises:

determining whether to redirect a message from the client to the LLM service in the conversation or a message from the LLM service to the client in the conversation based on the one or more policies.

3. The method of claim 1, further comprising:

generating and storing information representing a reputation of the client and/or of the LLM service, wherein applying the one or more policies is based on the reputation of the client and/or the LLM service.

4. The method of claim 1, wherein applying comprises applying the one or more policies to redirect requests to one or more other LLM services based on the client and/or specialization of the one or more other LLM services.

5. The method of claim 1, wherein applying comprises generating profile information for the conversation and applying analytics to discover and block anomalous conversations between the client and the LLM service.

6. The method of claim 1, further comprising:

identifying information in the response message from the LLM service; and correcting any incorrect information in the response message.

7. The method of claim 1, further comprising:

sending a request message received from the client to multiple LLM services;

receiving response messages from the multiple LLM services; and selecting among the response messages to provide a selected response message and/or aggregating the response messages from the multiple LLM services into a single response message.

8. The method of claim 1, wherein intercepting, deriving, and applying are performed for each instance of a conversation between a client of a plurality of clients and a LLM service of a plurality of LLM services.

9. The method of claim 1, wherein applying the one or more policies includes tracking occurrences of a hallucination of the LLM service.

10. The method of claim 1, wherein applying the one or more policies includes identifying insecure code contained in the response message from the LLM service, and providing a flag in the response message indicating the insecure code.

11. The method of claim 1, wherein applying the one or more policies includes detecting a jailbreak attempt being made by the LLM service based on content of the response message.

12. The method of claim 1, wherein deriving context includes identifying and maintaining information about intent of the client or the LLM service, and wherein applying comprises taking an action based on the one or more policies and an intent threshold.

13. An apparatus comprising:

a communication interface functionally positioned between a client and a Large Language Model (LLM) service, and configured to intercept communications associated with a conversation between the client and the Large Language Model (LLM) service, the communications including a request message from the client to the LLM service and a response message from the LLM service to the client;

a memory; and at least one processor coupled to the communication interface and the memory, the at least one processor configured to perform operations including:

deriving a context for the conversation based on the communications between the client and the LLM service; and applying one or more policies to the communications between the client and the LLM service based on the context, wherein applying includes determining whether to block or rewrite a message from the client to the LLM service in the conversation or a message from the LLM service to the client in the conversation based on the one or more policies.

14. The apparatus of claim 13, wherein applying further includes:

determining whether to redirect a message from the client to the LLM service in the conversation or a message from the LLM service to the client in the conversation based on the one or more policies.

15. The apparatus of claim 13, wherein the at least one processor is further configured to perform operations of:

generating and storing information representing a reputation of the client and/or of the LLM service, wherein applying the one or more policies is based on the reputation of the client and/or the LLM service.

16. The apparatus of claim 13, wherein applying comprises applying the one or more policies to redirect requests to one or more other LLMs based on the client and/or specialization of the one or more other LLMs.

17. The apparatus of claim 13, wherein the at least one processor is further configured to perform operations including:

sending a request message received from the client to multiple LLM services;

receiving response messages from the multiple LLM services; and selecting among the response messages to provide a selected response message and/or aggregating the response messages from the multiple LLM services into a single response message.

18. One or more non-transitory computer readable storage media encoded with software comprising computer executable instructions and when the software is executed operable to perform operations including:

intercepting, by a firewall functionally positioned between a client and a Large Language Model (LLM) service, communications associated with a conversation between the client and the Large Language Model (LLM) service, the communications including a request message from the client to the LLM service and a response message from the LLM service to the client;

deriving a context for the conversation based on the communications between the client and the LLM service; and applying one or more policies to the communications between the client and the LLM service based on the context, wherein applying includes determining whether to block or rewrite a message from the client to the LLM service in the conversation or a message from the LLM service to the client in the conversation based on the one or more policies.

19. The one or more non-transitory computer readable storage media of claim 18, wherein applying the one or more policies includes identifying insecure code contained in the response message from the LLM service, and providing a notation in the response message indicating the insecure code.

20. The one or more non-transitory computer readable storage media of claim 18, wherein deriving context includes identifying and maintaining information about intent of the client or the LLM service, and wherein applying comprises taking an action based on the one or more policies and an intent threshold.

* * * * *